US008371943B2

(12) United States Patent
Kishi et al.

(10) Patent No.: US 8,371,943 B2
(45) Date of Patent: Feb. 12, 2013

(54) GAME PROCESSING APPARATUS FOR PERFORMING AREA AUTHENTICATION OF GAMING INFORMATION

(75) Inventors: Hideaki Kishi, Tokyo (JP); Takashi Abe, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 683 days.

(21) Appl. No.: 12/128,300

(22) Filed: May 28, 2008

(65) Prior Publication Data

US 2009/0005177 A1    Jan. 1, 2009

(30) Foreign Application Priority Data

Jun. 26, 2007    (JP) ................. 2007-167899

(51) Int. Cl.
*A63F 9/24* (2006.01)
(52) U.S. Cl. ........................................................ 463/43
(58) Field of Classification Search .................. 360/131; 365/94; 463/43, 44; 720/718–746; 700/90–93
See application file for complete search history.

(56) References Cited

U.S. PATENT DOCUMENTS

| 5,643,086 | A | * | 7/1997 | Alcorn et al. .................... 463/29 |
| 5,812,980 | A | * | 9/1998 | Asai ................................. 705/55 |
| 6,035,400 | A | * | 3/2000 | Yasuoka ........................... 436/1 |
| 6,071,190 | A | * | 6/2000 | Weiss et al. ..................... 463/25 |
| 6,106,396 | A | * | 8/2000 | Alcorn et al. .................... 463/29 |
| 6,149,522 | A | * | 11/2000 | Alcorn et al. .................... 463/29 |
| 6,190,257 | B1 | * | 2/2001 | Takeda et al. .................... 463/29 |
| 6,488,585 | B1 | * | 12/2002 | Wells et al. ...................... 463/43 |
| 6,565,443 | B1 | * | 5/2003 | Johnson et al. ................... 463/43 |
| 6,595,856 | B1 | * | 7/2003 | Ginsburg et al. ................. 463/29 |
| 6,685,567 | B2 | * | 2/2004 | Cockerille et al. ................ 463/43 |
| 6,722,986 | B1 | * | 4/2004 | Lyons et al. ..................... 463/29 |
| 7,111,141 | B2 | * | 9/2006 | Nelson ........................... 711/170 |
| 7,931,533 | B2 | * | 4/2011 | LeMay et al. .................... 463/29 |
| 2003/0032485 | A1 | * | 2/2003 | Cockerille et al. ............... 463/43 |
| 2003/0078103 | A1 | * | 4/2003 | LeMay et al. .................... 463/43 |
| 2003/0196102 | A1 | | 10/2003 | McCarroll |
| 2004/0063495 | A1 | * | 4/2004 | LeMay et al. .................... 463/42 |
| 2004/0068654 | A1 | * | 4/2004 | Cockerille et al. ............... 713/168 |

(Continued)

FOREIGN PATENT DOCUMENTS

| EP | 0769751 | 4/1997 |
| EP | 1352677 | 10/2003 |

(Continued)

OTHER PUBLICATIONS

Office communication for Rejection issued in corresponding case, dated Dec. 11, 2009.

*Primary Examiner* — Dmitry Suhol
*Assistant Examiner* — Jason Skaarup
(74) *Attorney, Agent, or Firm* — Lexyoume IP Meister, PLLC.

(57) ABSTRACT

A game processing apparatus is provided, which includes a first memory, a second memory, and a controller. The first memory stores gaming information including information related to gaming rules corresponding to an area. The second memory stores a predetermined first area code representing a specific area. The controller is configured with logic to: (a) calculate a second area code corresponding to the area according to the gaming information; (b) compare the second area code with the first area code so as to determine whether the gaming information matches the specific area; and (c) when the controller determines a mismatching, restrict a start of a game.

5 Claims, 11 Drawing Sheets

U.S. PATENT DOCUMENTS

| | | | |
|---|---|---|---|
| 2004/0266533 A1* | 12/2004 | Gentles et al. | 463/42 |
| 2005/0143171 A1* | 6/2005 | Loose | 463/29 |
| 2006/0036874 A1* | 2/2006 | Cockerille et al. | 713/187 |
| 2006/0240888 A1* | 10/2006 | Tanimura | 463/20 |
| 2006/0247004 A1* | 11/2006 | Tanimura | 463/20 |
| 2006/0247005 A1* | 11/2006 | Tanimura | 463/20 |
| 2006/0247050 A1* | 11/2006 | Mathis | 463/39 |
| 2007/0105622 A1* | 5/2007 | Okada | 463/29 |
| 2007/0287536 A1* | 12/2007 | Sharpless et al. | 463/29 |
| 2008/0045342 A1* | 2/2008 | Crowder et al. | 463/42 |
| 2008/0096628 A1* | 4/2008 | Czyzewski et al. | 463/17 |
| 2008/0153588 A1* | 6/2008 | Muir et al. | 463/29 |

FOREIGN PATENT DOCUMENTS

| | | |
|---|---|---|
| EP | 1703478 | 9/2006 |

* cited by examiner

GAME PROCESSING APPARATUS FOR PERFORMING AREA AUTHENTICATION OF GAMING INFORMATION

This application is based on and claims the benefit of priority from Japanese Patent Application No. 2007-167899, filed on 26 Jun. 2007, the content of which is incorporated herein by reference.

BACKGROUND OF THE INVENTION

1. Field of the Invention

The present invention relates to a game processing apparatus for performing area authentication of gaming information.

2. Related Art

Conventionally, a gaming machine has been known which includes a card slot of a memory card storing gaming information, a gaming board, and a motherboard including RAM. The gaming board includes an authentication program for authenticating the gaming information and a preliminary authentication program for authenticating the authentication program. The gaming machine causes the RAM of the motherboard to store the authentication program for which the authentication has been completed by the preliminary authentication program. Subsequently, the gaming machine performs the authentication for the gaming information (see U.S. Patent Application, First Publication No. 2006/0240888).

Generally, gaming rules differ from one area to another where gaming machines are installed. For example, there is an area where gaming rules such as upper limits of awarding rates and bets are set to a player's advantage. Under such circumstances, it may be that some owners of casinos fraudulently obtain a memory card, which is originally employed by such an area of gaming rules advantageous to a player, so as to attract more players. Although the gaming machine disclosed in U.S. 2006/0240888 performs the authentication of the gaming information of a memory card, it is intended to protect against tampering of the memory card. Accordingly, if the gaming information that does not belong to a particular area undergoes the successful authentication, the memory card storing the gaming information of a different area can be used at the particular area.

SUMMARY OF THE INVENTION

A game processing apparatus is provided, which performs the authentication dedicated to a local area for a memory card so as to prevent use of other memory cards that store gaming information prepared for different areas.

In an aspect of the present invention, a game processing apparatus is provided, which includes a first memory, a second memory, and a controller. The first memory stores gaming information including information related to gaming rules corresponding to an area. The second memory stores a predetermined first area code representing a specific area. The controller is configured with logic to: (a) calculate a second area code corresponding to the area according to the gaming information; (b) compare the second area code with the first area code so as to determine whether the gaming information matches the specific area; and (c) when the controller determines a mismatching, restrict a start of a game.

The game processing apparatus described above determines that the gaming information corresponding to the area is false if it does not match the specific area. Since the game processing apparatus does not permit a game to start for a false case, it can reject execution of the game which is performed based on a rule that is prohibited in the specific area.

In another aspect of the present invention, a game processing apparatus is provided, in which the first memory and the second memory are mounted onto a printed board, and the printed board is attachable and detachable from the game processing apparatus.

When maintenance is performed for the gaming information stored in the first memory, the first area code stored in the second memory is also required to be updated, because the second area code calculated based on the gaming information changes. Since the first and second memories are mounted onto the same printed board that is attachable and detachable from the game processing apparatus, the game processing apparatus allows for easy maintenance of the gaming information and the first area code.

In a still another aspect of the present invention, a game processing apparatus is provided, in which the second memory is a nonvolatile memory having read protection.

With the game processing apparatus described above, it is possible to prevent the data stored in the second memory from being read to write into a ROM for duplication. This eliminates a dishonest act by duplication. Furthermore, a device for which a logic circuit can be electrically written and erased, such as General Array Logic (GAL), can be used for the second nonvolatile memory.

In yet another aspect of the present invention, a game processing apparatus according is provided, in which the second memory outputs the first area code in response to reception of a predetermined signal.

The game processing apparatus described above, which has the second memory that requires input of the predetermined signal to obtain the first area code, increases security and rejects another type of dishonest act.

In a further aspect of the present invention, a game processing apparatus is provided, in which the controller is further configured with logic to output a CRC value for verifying data reliability as the second area code.

The game processing apparatus further increases security.

DETAILED DESCRIPTION OF THE INVENTION

Embodiments of the Present Invention are Described Below.

Similar components and parts are designated by the same symbols and hence detailed description is not repeated.

Game processing apparatuses 1 and 2 according to the present invention include a game program Compact Flash (CF) (registered trademark) 30a and a game system program CF 30b that store gaming information including information related to a game rule corresponding to a area, and Generic Array Logic (GAL) 30d storing a predetermined first area code indicating information related to a specific area. Main CPU 21 calculates a second area code corresponding to the area based on the gaming information, comparing the second area code with the first area code so as to determine whether the game information is in agreement with the specific area. If the main CPU 21 recognizes a disagreement, it restricts a start of a game.

Figure 1:
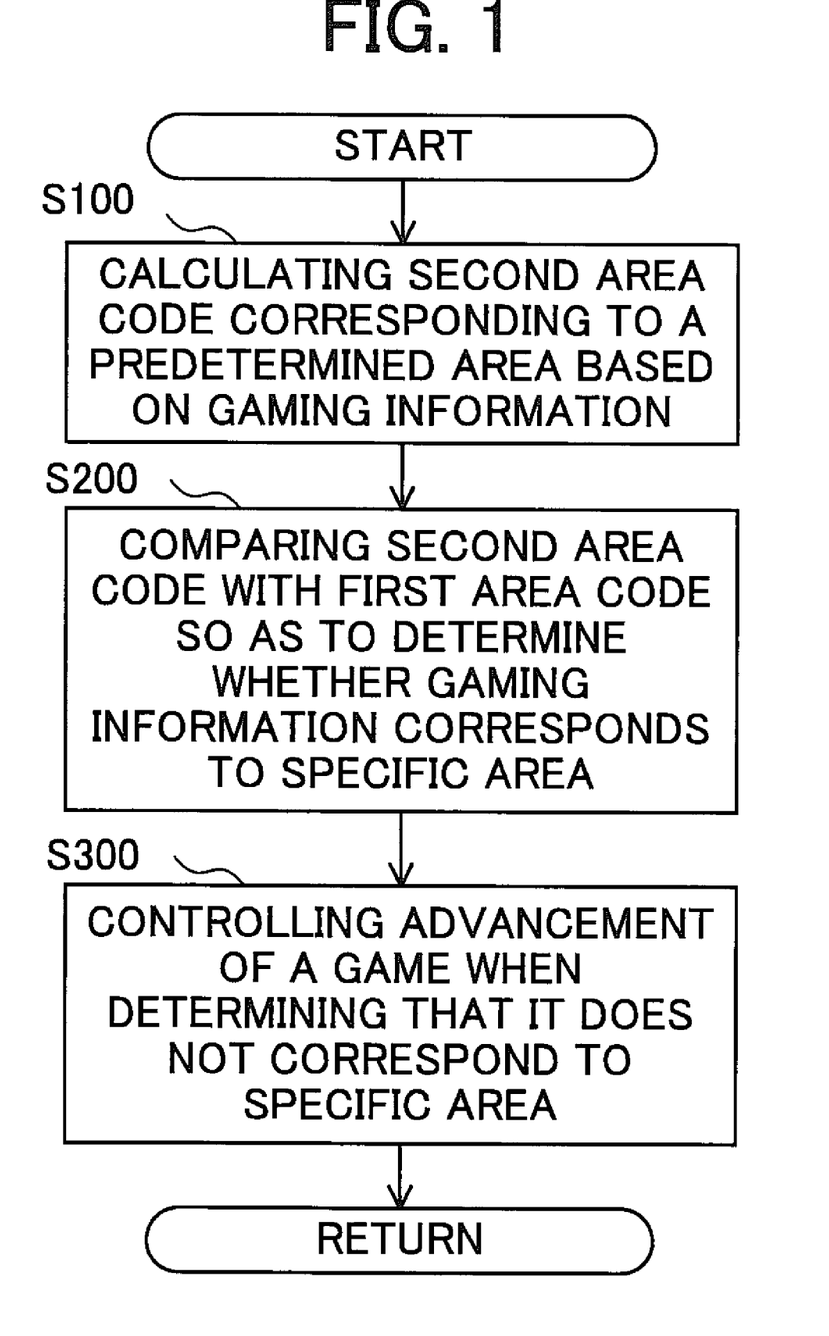
FIG. 1 is a flowchart showing processing that is executed in a game processing apparatus according to the present invention.

More specifically, though details are described later, processing advances as follows: As shown in FIG. 1, the main CPU 21 calculates the second area code corresponding to an area (Step S100), compares the second area code with the first area code so as to determine whether the gaming information is in agreement with the specific area or not (Step S200), and if the main CPU 21 recognizes a disagreement, it restricts a start of a game. (Step S300).

First Embodiment

Configuration of Game Processing Apparatus

Figure 2:
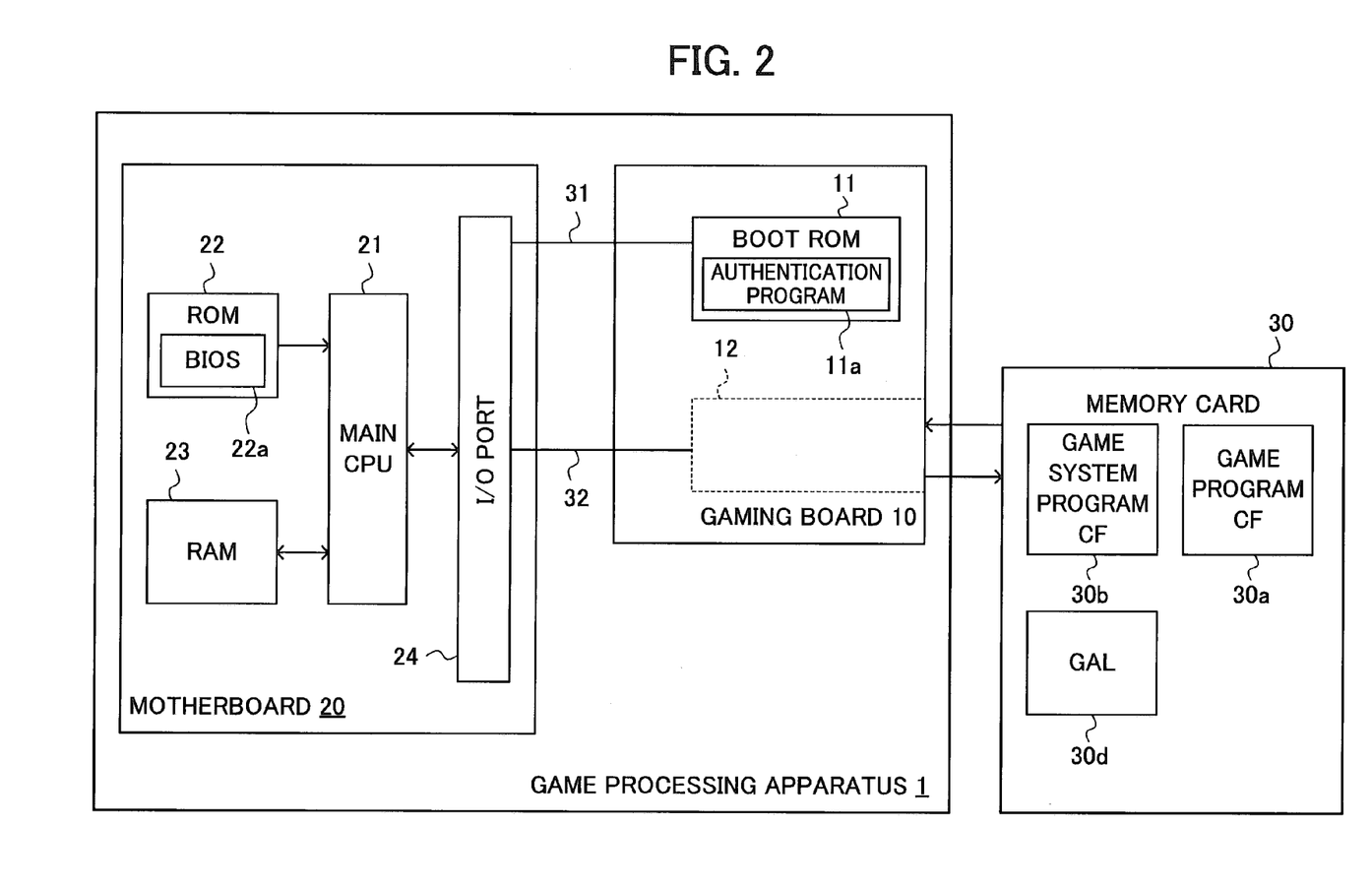
FIG. 2 is a block diagram showing a configuration of the game processing apparatus according to the present invention.

FIG. 2 is a block diagram showing an overall configuration of the game processing apparatus 1. The game processing apparatus 1 includes a gaming board 10 and a motherboard 20. The gaming board 10 is connected with the motherboard 20 via a PCI bus 31 and an IDE bus 32, which are employed as signal transmission portions. The game processing apparatus 1 carries out authentication and loading processing for a game program 30e and a game system program 30f, which are stored in a game program CF 30a and a game system program CF 30b, respectively. The game program CF 30a and the game system program CF 30b are attached to a memory card 30.

The gaming board 10, which includes a boot ROM 11 and an insertion slot 12 that accepts the memory card 30, loads the game program 30e and the game system program 30f from the game program CF 30a and the game system program CF 30b as storage media of the present invention to the motherboard 20.

The boot ROM 11 is connected with the motherboard 20 via the PCI bus 31. The boot ROM 11 stores an authentication program 11a (described later) and a program (a boot code, not shown) by which the main CPU 21 (described later) on the motherboard 20 boots (activates) the authentication program 11a via the PCI bus 31. The authentication program 11a includes instructions for performing authentication of gaming information (authentication processing), which allow the gaming information to be verified and obtain authentication that it has not been tampered. The authentication program 11a authenticates the game program 30e and the game system program 30f, which are to be provided to the slot machine 41, using the game program CF 30a and the game system program CF 30b attached to the memory card 30. The authentication program 11a, which authenticates that the game program 30e and the game system program 30f have not been tampered, is also called a tampering check program.

The insertion slot 12 is a slot (a physical connector) into which the memory card 30 can be inserted. The insertion slot 12 accepts the memory card 30 in the condition that the game program 30e and the game system program 30f can be read from the game program CF 30a and the game system program CF 30b, respectively.

The motherboard 20 is composed using a commercially available motherboard (a printed circuit board mounting basic components of a personal computer), and includes the main Central Processing Unit (CPU) 21 shown in FIG. 2, Read Only Memory (ROM) 22, Random Access Memory (RAM) 23, and an I/O port 24. The Peripheral Component Interconnect (PCI) bus 31 and the Integrated Device Electronics (IDE) 32 are connected with the I/O port 24. When a power supply unit (not shown) connected with the motherboard 20 is activated, the main CPU 21 executes a Basic Input/Output System (BIOS) (described later) stored in the ROM 22, and initializes the peripheral devices including the gaming board 10. Then, the main CPU 21 reads the game program 30e and the game system program 30f stored in the game program CF 30a and the game system program CF 30b, respectively, via the gaming board 10, and carries out authentication and loading processing. Upon electric power being supplied to the motherboard 20 from the power supply unit connected to the motherboard 20, the main CPU 21 on the motherboard 20 starts up, and the electric power is supplied to the gaming board 10 via the PCI bus 31.

A program such as the BIOS 22a (standard BIOS on the motherboard 20), which is executed by the main CPU 21, and permanent data are stored in the ROM 22. A memory device such as a flash memory can be employed for the ROM 22. However, any rewritable or non-rewritable device can be used for the ROM 22. Data and programs used for the operation of the main CPU 21 are stored in the readable and writable RAM 23. For example, the authentication program 11a which is read via the gaming board 10, the game program 30e, and the game system program 30f are stored in the RAM 23.

The memory card 30 is a substrate to which the game program CF 30a and the game system program CF 30b are attached, which serve as storage media storing gaming information used in a game. The game program 30e and the game system program 30f as gaming information in the present invention are stored in the game program CF 30a and the game system program CF 30b, respectively. In the present invention, each of the game program 30e and the game system program 30f is a program specific to a slot game. Moreover, Generic Array Logic (GAL) 30d is attached to the memory card 30. The GAL 30d is one type of Programmable Logic Device (PLD) having an OR fixed array structure and a nonvolatile memory in which a logic circuit can be electrically written and erased. The GAL 30d includes a plurality of input ports and output ports. Upon reception of data via the input ports, output data corresponding to the input data is output via the output ports. Since the GAL 30d is nonvolatile memory whose stored data cannot be read, as described above, predetermined data needs to be inputted to the GAL 30d via the input port so as to obtain data. In addition, the PCI bus 31 enables signal transmission between the motherboard 20 and the gaming board 10. Furthermore, the PCI bus 31 supplies electric power from the motherboard 20 to the gaming board 10.

Figure 3:
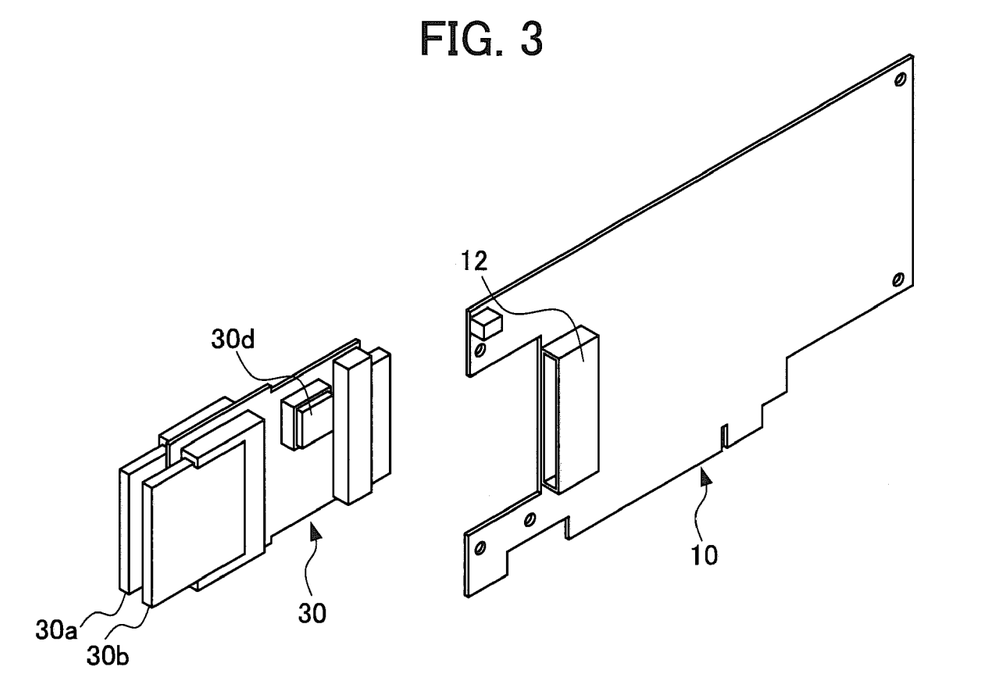
FIG. 3 shows a relationship between a memory card and a gaming board according to the present invention.

FIG. 3 shows a relationship between the memory card 30 and the gaming board 10. The memory card 30, which is attachable and detachable from the gaming board 10, is connected to the gaming board 10 via the insertion slot 12 attached to the gaming board 10.

The game program CF 30a, the game system program CF 30b, and the GAL 30d are detachably attached to the memory card 30.

Since the memory card 30, to which the game program CF 30a, the game system program CF 30b, and the GAL 30d are fixed, is detachable from the gaming board 10, it is easy to perform maintenance on those storage media (the game program CF 30a, the game system program CF 30b, and the GAL 30d).

Configuration of Slot Machine

Figure 4:
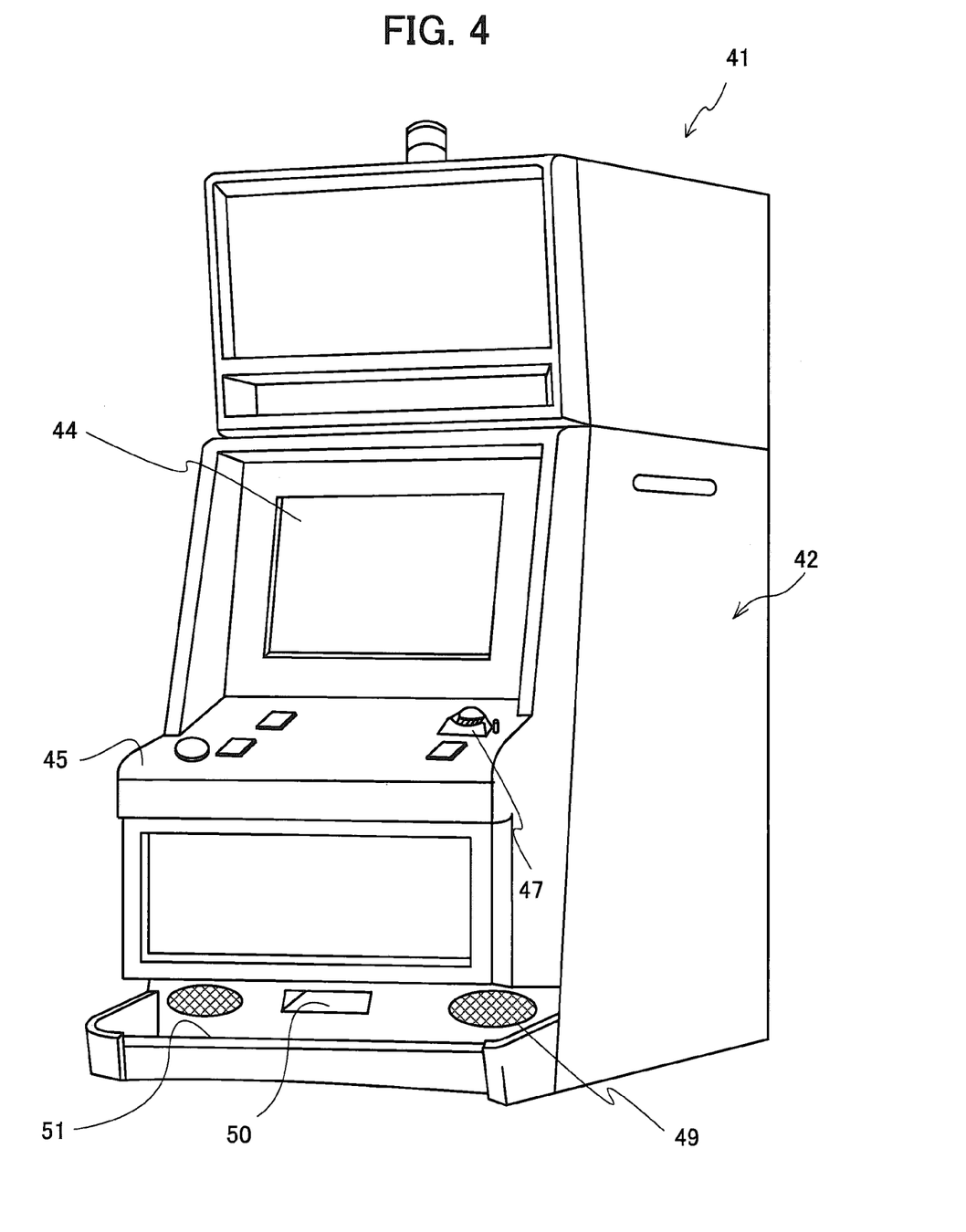
FIG. 4 is a perspective view showing a configuration of a slot machine according to the present invention.

FIG. 4 is a perspective view showing a configuration of the slot machine 41. The slot machine 41 is an exemplary gaming machine according to an embodiment of the present invention. The game processing apparatus 1 described above is incorporated into the slot machine 41. The slot machine 41 executes gaming operations based on the game program 30e and the game system program 30f loaded by the game processing apparatus 1.

The slot machine 41 includes a display means for displaying game images used in a game. The display means displays a plurality of reels (five reels), each of which has a plurality of symbols, and also displays variable images (reel images) in a scrolling motion. The slot machine 41 is configured as a video slot machine performing a slot game in which an award is determined according to a combination of symbols when each reel displayed by the display means is stopped (a reel displayed in the form of an image is also called "a virtual reel").

The slot machine 41 includes a cabinet 42 and an image display panel 44 on a front side of the cabinet 42. The image display panel 44 is configured with a liquid crystal display device (not shown) so that game images including reel images are displayed.

Then, the slot machine 41 includes a control panel 45 in which a plurality of operation buttons is provided below the image display panel 44 in order for a player to perform operation. A coin insertion slot 47 for inserting a game medium (hereinafter, a "coin") used in a game such as medals and coins is disposed on the right side of the control panel 45. The coin insertion slot 47 has a coin sensor 47a (see FIG. 5) outputting a signal indicating an inserted coin. In addition, a coin dispensing opening 50, a coin receiving portion 51 collecting coins dispensed, and speakers 49L and 49R on both left and right sides of the coin dispensing opening 50 are disposed on a bottom portion of the cabinet 42 of the slot machine 41.

Figure 5:
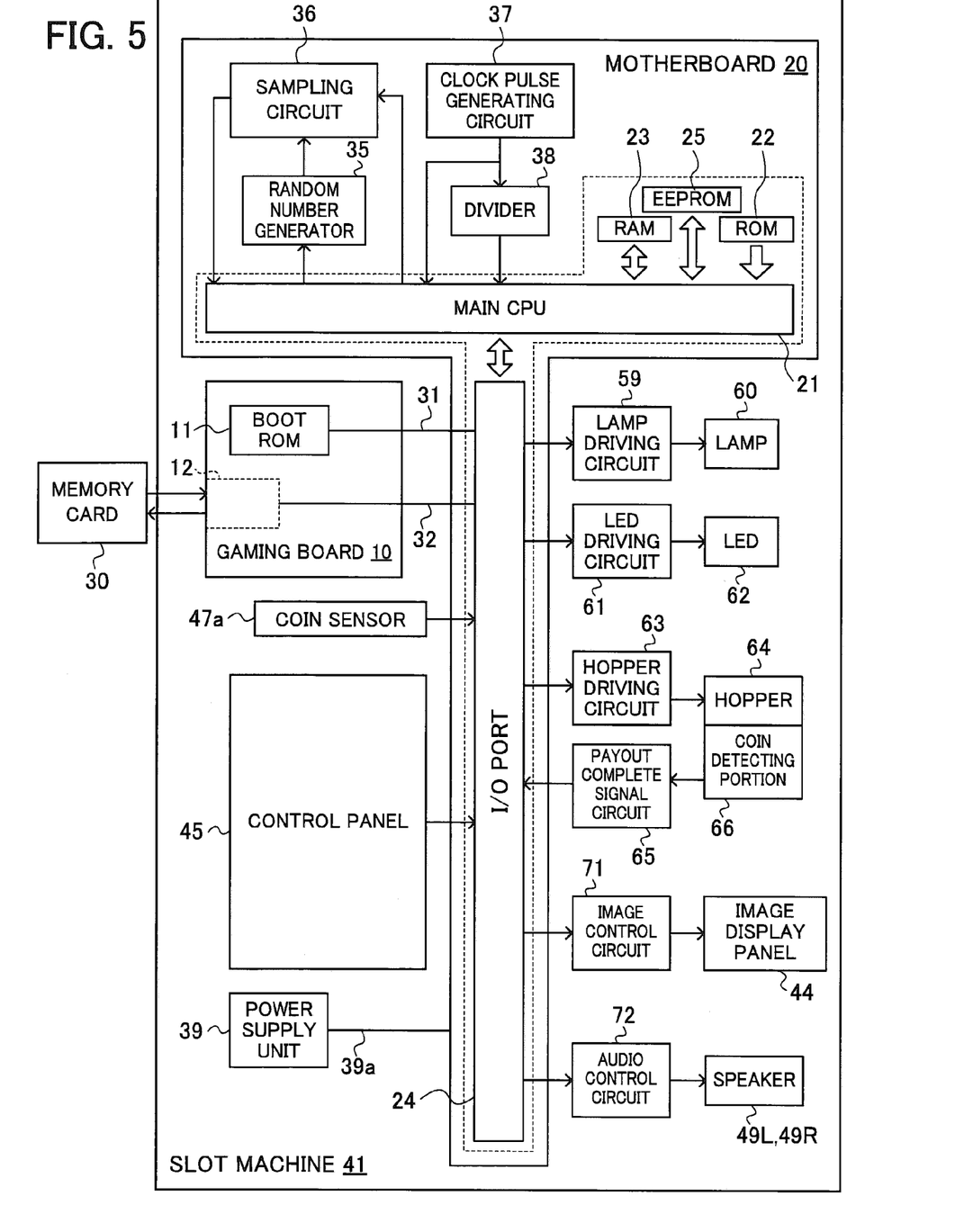
FIG. 5 is a block diagram mainly showing an inner configuration of the slot machine according to the present invention.

FIG. 5 is a block diagram mainly showing an inner configuration of the slot machine 41. The motherboard 20 and the gaming board 10 configuring the abovementioned game processing apparatus 1 are incorporated into the slot machine 41. The slot machine 41 also includes a plurality of components as an apparatus for executing game operations. The motherboard 20 includes Electronically Erasable and Programmable Read Only Memory (EEPROM) 25, a random number generator 35, a sampling circuit 36, a clock pulse generating circuit 37, and a divider 38 in addition to the main CPU 21, the ROM 22, the RAM 23, the I/O port 24 described above. A power supply unit 39 is connected to the motherboard 20 via a power supply cable 39a. The EEPROM 25 is nonvolatile memory for which contents can be electrically rewritten. The random number generator 35 operates based on an instruction from the main CPU 21, and generates random numbers in a prescribed range. The sampling circuit 36 extracts an optional random number from the random numbers generated by the random number generator 35 based on the instruction from the main CPU 21, and inputs it to the CPU 21. The clock pulse generating circuit 37 generates a reference clock for operating the main CPU 21. The divider 38 inputs a signal indicating the reference clock divided by a constant period to the main CPU 21.

In addition, the slot machine 41, as an apparatus for executing a game, includes a lamp driving circuit 59, a lamp 60, a LED driving circuit 61, an LED 62, a hopper driving circuit 63, a hopper 64, a payout complete signal circuit 65, a coin detecting portion 66, an image control circuit 71, and an audio control circuit 72.

The lamp driving circuit 59 outputs a signal for illuminating the lamp 60, and allows the lamp 60 to blink in a game, which performs a rendered effect. The LED driving circuit 61 controls a blinking display of the LED 62. The LED 62 displays an amount of credits, an acquired amount of credits, and the like. The hopper driving circuit 63 drives the hopper 64 in response to control of the main CPU 21. The hopper 64 performs a payout of coins won by a player. The hopper 64 dispenses coins to the coin receiving portion 51 from the coin dispensing opening 50. The coin detecting portion 66 counts an amount of coins paid out from the hopper 64, and transmits data of the amount of coins thus counted to the payout complete signal circuit 65. The circuit 65 inputs a value of the amount of coins from the coin detecting portion 66, and inputs the signal notifying the completion of dispensing of coins to the main CPU 21 when this value reaches a threshold.

The image control circuit 71 causes the image display panel 44 to display various images such as variable display images of a plurality of symbols.

The audio control circuit 72 receives an audio signal from an audio source IC and amplifies the audio signal so as to allow the speakers 49L and 49R to produce sounds. In this way, the speakers 49L and 49R produce sounds to render the game exciting at an appropriate time after a game has been started, for example.

It should be noted that the image control circuit 71 and the audio control circuit 72 can be mounted onto the motherboard 20 if the image control program and the audio control program are stored in the ROM 22 and the main CPU 21 is adapted to execute processing in accordance with these programs. In addition, the power supply unit 39 is connected with the other components in addition to the motherboard 20. However, the connection with components other than the motherboard 20 is omitted for convenience sake of illustration in FIG. 5.

Operations of Game Processing Apparatus and Slot Machine

Next, operations of the game processing apparatus 1 and the slot machine 41 with the abovementioned configurations are described with reference to FIGS. 2, 6, and 7.

Figure 6:
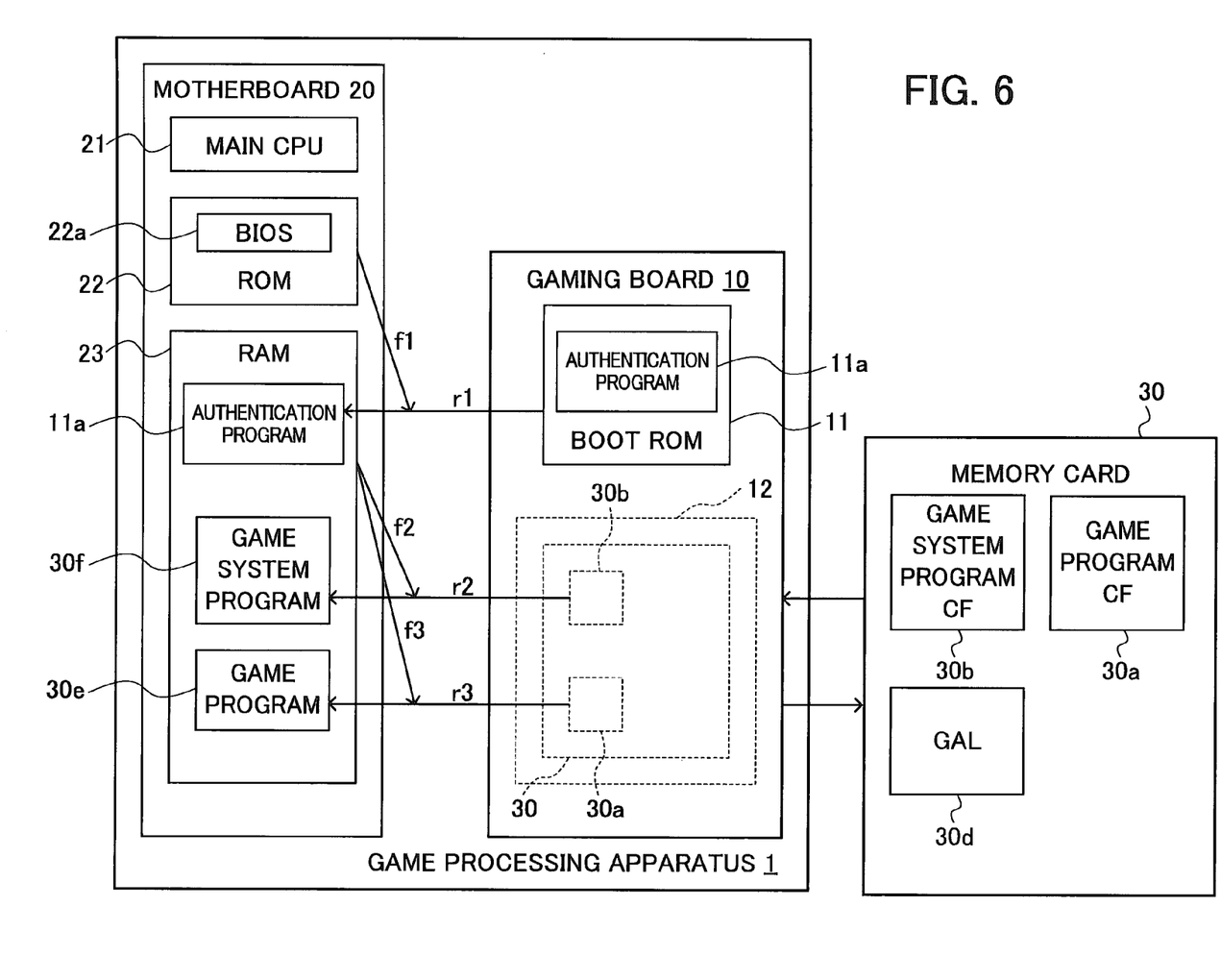
FIG. 6 is a block diagram showing processing for loading gaming information so as to perform authentication in the game processing apparatus according to the present invention.

FIG. 6 is a block diagram showing the authentication and loading processing of gaming information in the game processing apparatus 1. FIG. 7 is a flowchart showing the authentication and loading processing of gaming information performed by the gaming board 10 and the motherboard 20.

Figure 7:
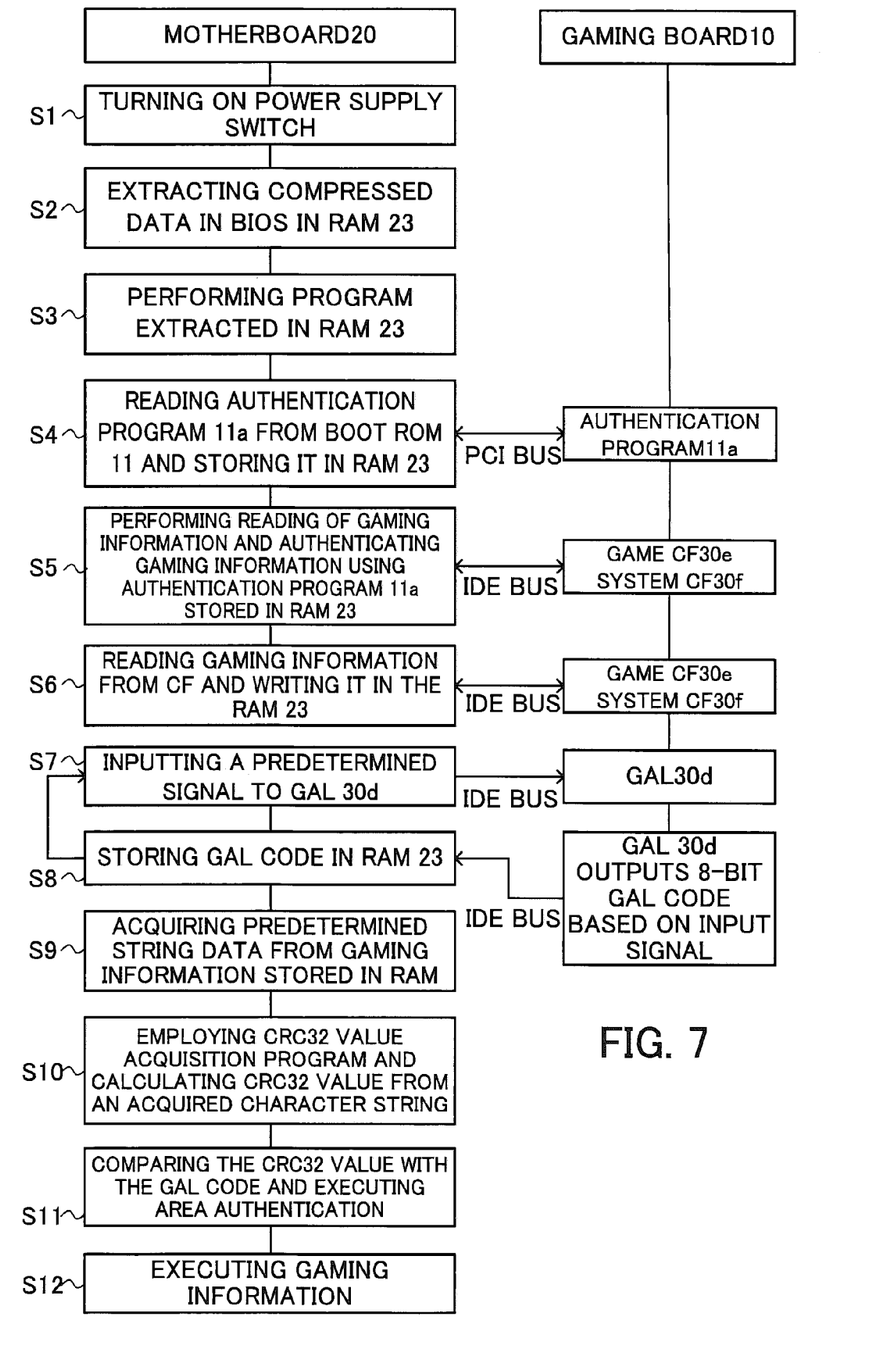
FIG. 7 is a flowchart showing processing for loading gaming information so as to perform authentication and processing for area authentication, which are performed by a gaming board and a motherboard according to the present invention.

In the game processing apparatus 1 and the slot machine 41, as shown in FIG. 7, for the authentication and loading processing of gaming information, a power supply switch of the power supply unit 39 connected with the motherboard 20 is turned on (Step S1). Before turning on the power supply switch, the memory card 30 is inserted into the insertion slot 12 on the gaming board 10.

The process advances to Step S2. In Step S2, the main CPU 21 executes the BIOS 22a, and causes the compressed data in the BIOS 22a to be decompressed in the RAM 23. Next, in Step S3, the main CPU 21 executes the BIOS thus decompressed in the RAM 23, and performs diagnostic processing and initialization processing for various types of peripheral devices. At this time, the main CPU 21 performs a check of what is connected with the PCI bus 31. Since the boot ROM 11 of the gaming board 10 is connected to the PCI bus 31, the main CPU 21 advances the process to Step S4 and reads the authentication program 11a stored in the boot ROM 11.

In addition, after reading the authentication program 11a, the main CPU 21 performs loading processing r1 for allowing the RAM 23 to store the authentication program 11a thus read. In the loading processing r1, the main CPU 21 stores the authentication program 11a in the RAM 23 while verifying that the stored data is error-free (f1, see FIG. 6) by performing a checksum according to the ADDSUM method (standard check function) according to a function provided by the standard BIOS 22a.

Next, in Step S5, after the main CPU 21 has verified what is connected to the IDE bus 32, the main CPU 21 accesses via the IDE bus 32 the game program CF 30a and the game system program CF 30b attached to the memory card 30 that has been inserted into the insertion slot 23. The main CPU 21 reads the game program 30e and the game system program 30f from the game program CF 30a and the game system program CF 30b. In this exemplary embodiment, the main CPU 21 reads data related to the game program 30e and the game system program 30f at an increment of four bytes. Then, the main CPU 21 performs authentication processing f2 for the game system program 30f thus read and authentication processing f3 for the game program 30e thus read according to the authentication program 11a stored in the RAM 23, verifying and authenticating that the game program 30e and the game system program 30f have not been tampered. After the authentication processing f2 and f3 have been completed successfully, the main CPU 21 advances the process to Step S6 and performs loading processing r2 of the game system program 30f and loading processing r3 of the game program 30e, to which the authentication processing has been applied (which have been authenticated). Subsequently, the main CPU 21 writes and stores the game program 30e and the game system program 30f in the RAM 23.

Although not shown, if an accident happens for some reason during authentication such as by tampering of the game system program 30f, so that the authentication processing is not completed successfully, the main CPU 21 raises an alarm, for example, by a display of error on the image display panel 44, and terminates the authentication processing. In this case, the loading processing is not performed. That is, the game program 30e and the game system program 30f are loaded in the motherboard 20 only when these programs are authenticated.

In this way, the main CPU 21 writes the game program 30e and the game system program 30f into the RAM 23 in Steps S1 to S6, and terminates the processing.

In Step S7, the main CPU 21 inputs a predetermined signal to the GAL 30d. The GAL 30d outputs a signal of 8 bits out of 32 bits of a first area code (GAL code) based on the signal entered by the main CPU 21. Next, in Step S8, the main CPU 21 causes the RAM 23 to store the GAL code. After repeating the processing four times, 32 bits of the first area code is stored in the RAM 23.

In other word, the main CPU 21 repeats the processing described above four times so as to obtain the GAL code and to store it in the RAM 23. The main CPU 21 obtains the uppermost 8 bits of the GAL code at the first time. Subsequently, the main CPU 21 obtains the second uppermost 8 bits, the third uppermost 8 bits, and the lowermost 8 bits.

In addition, the main CPU 21 outputs a signal corresponding to a bit sequence to be obtained in each time to the GAL 30d. Accordingly, a predetermined signal needs to be input to the GAL 30d to obtain the GAL code (the first area code). Thus, the security is improved enough to prevent from tampering. Moreover, since the GAL 30d is nonvolatile memory whose stored contents cannot be read, the first area code cannot be written in ROM for duplication. Therefore, tampering with duplication can be prevented.

In Step S9, the main CPU 21 obtains string data from the game program 30e and the game system program 30 stored as gaming information in the RAM 23. The string data includes string data of GAME data, such as "GAME NAME" and "PAYOUT BIT PATTERN" from the game program 30e, and "SYSTEM NAME" and the like from the game system program 30f, for example. In Step S10, the main CPU 21 acquires 32 bit data of a CRC32 value as a second area code with a CRC32 value acquisition program stored in the ROM 22. Here, the CRC32 value indicates a value calculated based on a Cyclic Redundancy check (CRC) method for checking data reliability. The CRC method employs a cyclic algorithm (generator polynomial) to generate a CRC value. This method has a feature to provide high detection accuracy of multiple bit error.

In Step S11, the main CPU 21 compares the acquired CRC32 value (the second area code) with the GAL code (the first area code) to execute area authentication. If the area authentication is successful, the main CPU 21 advances the processing to Step S12. If the area authentication is not successful, the main CPU 21 determines that the gaming information stored in the RAM 23 does not correspond to the first area code. Accordingly, it turns out that the game program CF 30a and the game system program CF 30b do not correspond to the first area code. Even if a game program CF and a game system program CF which do not correspond to the first area code are obtained fraudulently, it is possible to prevent playing a game with those programs.

In Step S12, the main CPU 21 controls game components to execute respective gaming operations according to the game program 30e and the game system program 30f stored in the RAM 23. For example, the image control circuit 71 displays an image used in a game such as virtual reels on the image display panel 44. The lamp driving circuit 59 turns on the lamp 60 for providing rendered effects according to proceedings of the game. In addition, the hopper driving circuit 63 causes the hopper 64 to dispense coins depending on a winning result in the game. Accordingly, a player can play a slot game with reference to the virtual reels.

The slot machine 41 is provided with the game program 30e and the game system program 30f through the game program CF 30a and the game system program 30b attached to the memory card 30. Subsequently, the game program 30e and the game system program 30f are authenticated and stored in the RAM 23. The game components execute game operations according to the game program 30e and the game system program 30f. In this way, the slot machine 41 allows a player to play the slot game.

As described above, the game processing apparatus 1 and the slot machine 41, in which the gaming board 10 is connected to the general-purpose motherboard 20, allow the gaming information stored in the memory card 30 to be read if the memory card 30 is inserted into the insertion slot 12 of the gaming board 10. In addition, the game processing apparatus 1 and the slot machine 41 allow the gaming information to be stored in the RAM 23 on the motherboard 20.

The gaming information can be loaded after the verification and authentication of being free of tampering, which is performed in accordance with the authentication program 11a that has instructions for authentication and that is stored in the boot ROM 11 of the gaming board 10. Accordingly, even if the gaming information is provided from outside the game processing apparatus 1 and the slot machine 41, it is certain that the gaming information thus loaded is legitimate gaming information which has not been tampered. Therefore, it is possible to surely prevent the gaming information from being tampered.

In addition, since the motherboard 20 is configured with a commercially available general-purpose motherboard in the game processing apparatus 1 and the slot machine 41, the cost of manufacturing can be saved.

In the abovementioned description, although the game program 30e and the game system program 30f for the slot game are loaded, a game program 30e and a game system program 30f for another game can be loaded instead. Thus, the slot machine 41 can execute another game such as a card game displaying card images.

Second Embodiment

Figure 8:
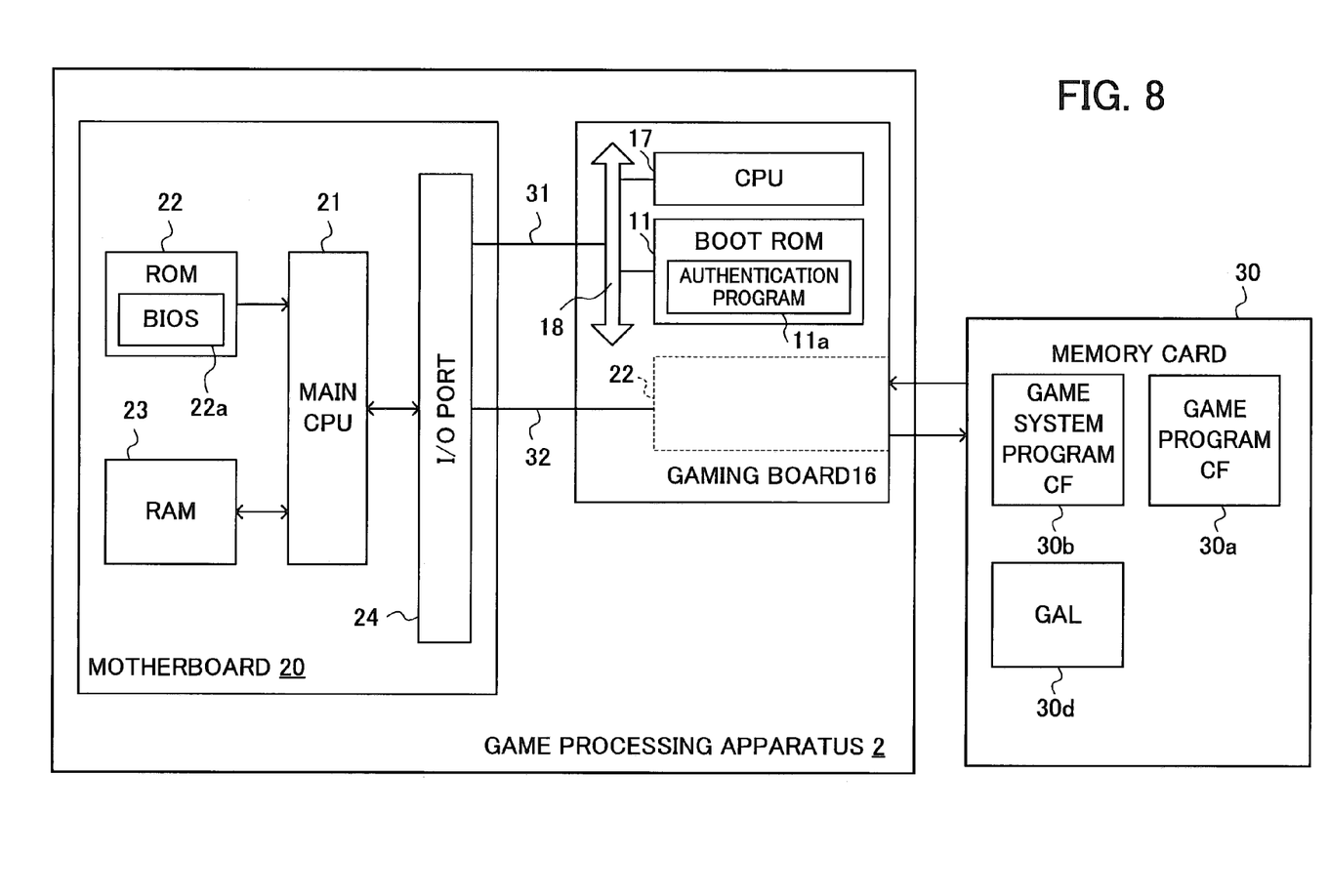
FIG. 8 is a block diagram showing a configuration of a game processing apparatus according to the present invention.

Next, a game processing apparatus 2 and a slot machine 101 according to a second embodiment are described with reference to FIGS. 8 and 9. FIG. 8 is a block diagram showing a configuration of the game processing apparatus 2, and FIG. 9 is a block diagram mainly showing an inner configuration of the slot machine 101.

As shown in FIG. 8, the game processing apparatus 2 is different from the game processing apparatus 1 according to the first embodiment in the following respects: the game processing apparatus 2 has a gaming board 16 instead of the gaming board 10.

The gaming board 16 is different from the gaming board 10 in the following respects: the gaming board 16 has a CPU 17 and an inner bus 18. The CPU 17 is connected to the boot ROM 11 via the inner bus 18.

Figure 9:
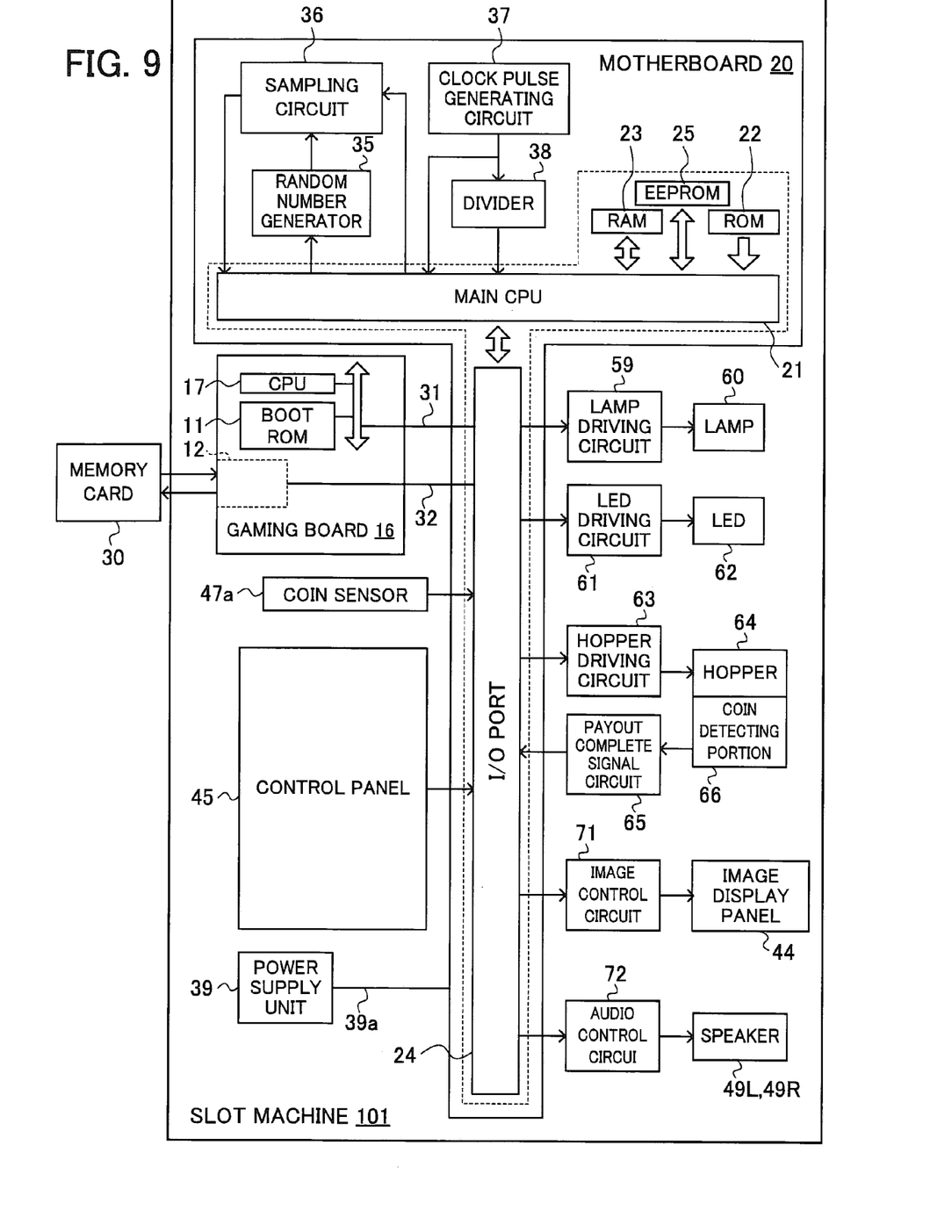
FIG. 9 is a block diagram mainly showing an inner configuration of the slot machine according to the present invention.

As shown in FIG. 9, the slot machine 101 is different from the slot machine 41 in the following respects: the slot machine 101 includes the game processing apparatus 2 in place of the game processing apparatus 1.

Figure 10:
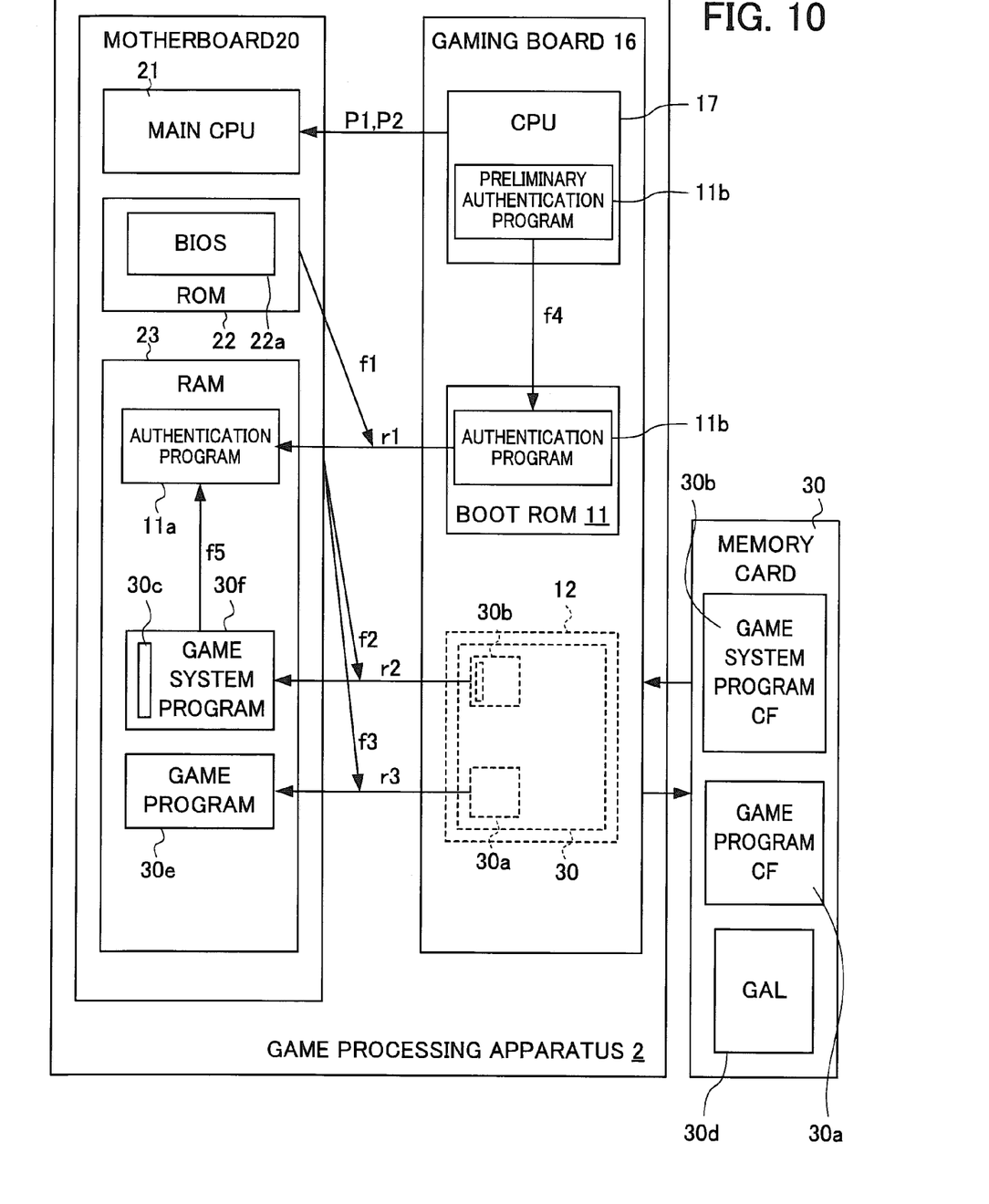
FIG. 10 is a block diagram showing processing for loading gaming information so as to perform authentication in the game processing apparatus according to the present invention.

As shown in FIG. 10, the game system program 30f stored in the game system program CF 30b includes a program 30c for executing mutual authentication f5 (hereinafter referred to as "mutual authentication program") to the authentication program 11a. This is also different from the first embodiment. It should be note that the mutual authentication program 30c may alternatively be independent from the game system program 30f. It is another difference between the first and second embodiments that ROM (not shown) built in the CPU 17 includes a program 11b for executing preliminary authentication f4 (hereinafter referred to as "preliminary authentication program") to the authentication program 11a. Although not shown, the preliminary authentication program 11b may alternatively be stored in the boot ROM 11.

Figure 11:
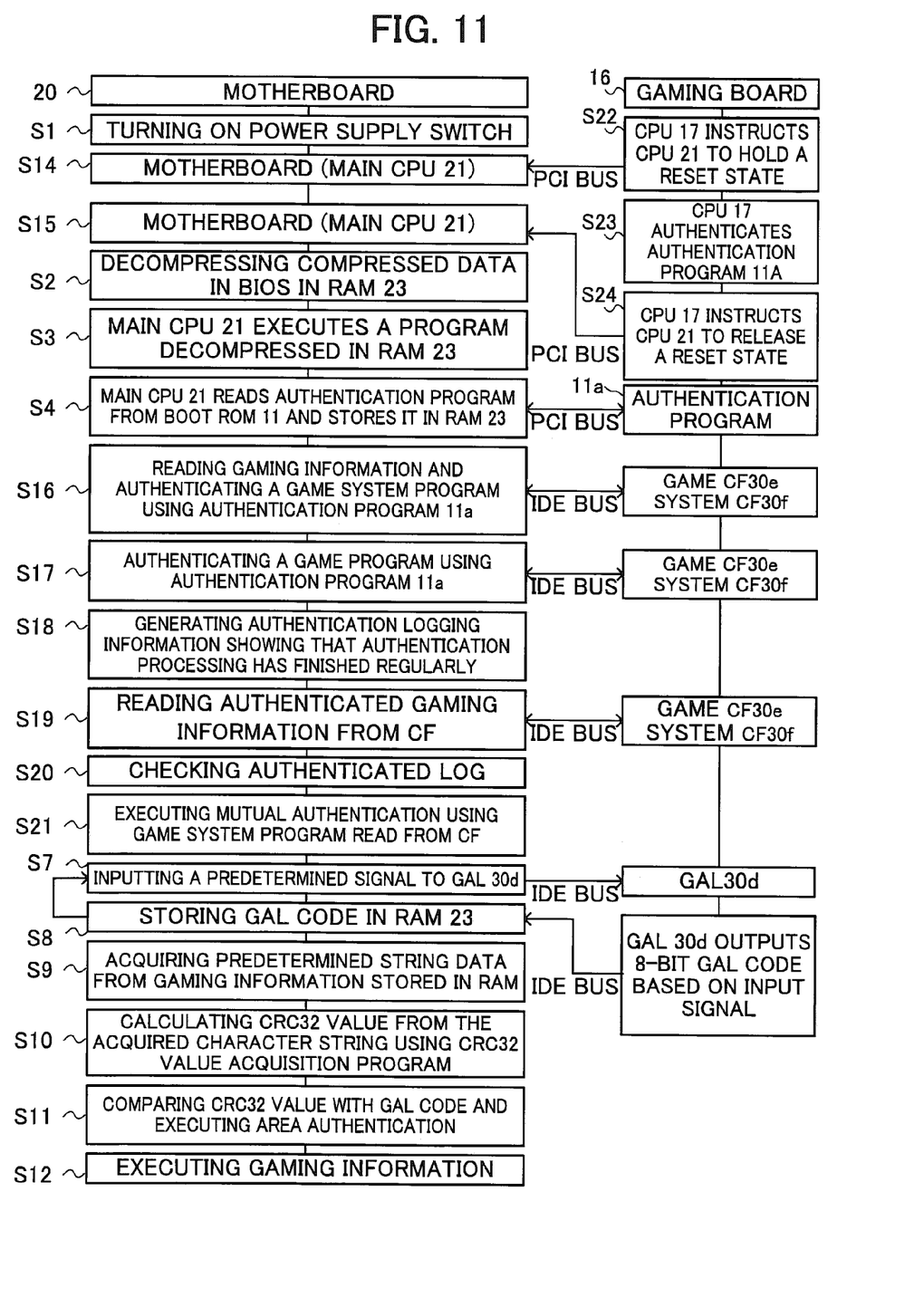
FIG. 11 is a flowchart showing processing for loading gaming information so as to perform authentication and processing for area authentication, which are performed by a gaming board and a motherboard according to the present invention.

The authentication and loading processing of gaming information is performed in accordance with processing shown in FIG. 11 in the game processing apparatus 2 and the slot machine 101. This authentication and loading processing is different from that performed in the game processing apparatus 1 and the slot machine 41 in the following respects: The authentication and loading processing executes Steps S14 and S15 between Steps S and S2 on the motherboard 20, and Steps S16 to S21 instead of Steps S5 and S6. The CPU 17 of the gaming board 16 executes Steps S22, S23, and S24.

First, when the power supply switch for the power supply unit 39 is turned on (Step 1), processing on the gaming board 16 is started. Then, in Step S22, the CPU 17 executes output processing P1 for reset control (to output a reset signal) to the main CPU 21 via the PCI bus 31. The reset control causes the main CPU 21 to hold a reset state without carrying out any processing until the CPU 17 executes output processing P2 to output a release instruction in Step S24 (described later) to the main CPU 21. Next, in Step S23, the CPU 17 reads the preliminary authentication program 11b stored in the boot ROM 11, and executes the preliminary authentication f4 (see FIG. 10) for verifying and authenticating that the authentication program 11a before loaded to the motherboard 20 has not been tampered with, using the preliminary authentication program 11b. If the preliminary authentication f4 has been finished successfully, the CPU 17 advances to Step S24 and executes the output processing P2 for outputting a release instruction to the main CPU 21, which releases the reset state of the main CPU 21.

On the other hand, on the motherboard 20, in Step S14, the main CPU 21 receives the output processing P1 of the reset control to enter the reset state where the main CPU 21 stops any processing. The main CPU 21 maintains the reset state until the CPU 17 executes the output processing P2 to output a release instruction to the main CPU 21. In the subsequent Step S15, when the main CPU 21 receives the release instruction of the output processing P2, the reset state of the main CPU 21 is released. Following Step S15, the main CPU 21 executes Steps S2, S3, and S4 in series similarly with the first embodiment, and reads from the boot ROM 11 the authentication program 11a, which is authenticated by the preliminary authentication f4. The main CPU 21 causes the RAM 23 to store the authentication program 11a. Steps S14 and S15 of the motherboard 20 and Steps S22 to S24 of the gaming board 16 may alternatively be arranged as follows: A storage area such as a register or memory for checking completion of the preliminary authentication f4 is provided beforehand to the gaming board 16 or the motherboard 20. When the CPU 17 finishes the preliminary authentication f4, it rewrites contents of the storage area with a flag of termination. Accordingly, the main CPU 21 can detect the completion of the preliminary authentication f4 performed by the CPU 17 by monitoring the rewritten contents of the storage area. Since the main CPU 21 reads the authentication program 11a after detecting the completion of the preliminary authentication f4, it is possible to prevent the main CPU 21 from reading the authentication program 11a before completion of the preliminary authentication f4. At the same time time, this can prevent the occurrence of a signal collision due to the CPU 17 and the main CPU 21 simultaneously accessing the PCI bus 31 without using an additional device such as a bus switching device.

In Step S16, the main CPU 21 reads the game program 30e and the game system program 30f from the game program CF 30a and the game system program CF 30b in the similar process as Step S5. Next, the main CPU 21 executes the authentication processing f2 for the game system program 30f according to the authentication program 11a stored in the RAM 23. In the following Step S17, if the authentication processing f2 is successful, the main CPU 21 executes the authentication processing f3 for the game program 30e according to the authentication program 11a.

When the authentication processing f2 and f3 in Steps S16 and S17 are successful, the main CPU 21 advances the processing to Step S18. In Step S18, the main CPU 21 executes authentication logging processing for generating authentication log information, which indicates that the authentication processing f2 for the game system program 30f and the authentication processing f3 for the game program 30e are successful, and then causes the generated authentication log information to be stored in the RAM 23. In Step S19, the main CPU 21 executes the loading processing r3 for the game program 30e authenticated in the authentication processing f3 and the loading processing r2 for the game system program 30f authenticated in the authentication processing f2 so as to write these programs 30e and 30f into the RAM 23.

In the following Step S20, the main CPU 21 accesses an address of the RAM 23 storing the authentication log information so as to refer to it, and verifies whether the authentication processing f2 for the game system program 30f and the authentication processing f3 for the game program 30e are successful. When the main CPU 21 verifies that both authentication processing f2 and f3 are successful, it advances the processing to Step S21. In Step S21, the main CPU 21 executes the mutual authentication processing f5 for the authentication program 11a, which is read from the boot ROM 11 and stored in the RAM 23, so as to posteriorly verify its authenticity according to the mutual authentication program 30c included in the game system program 30f written in the RAM 23. As described above, the authentication program 11a is authenticated by the game system program 30f, for which authentication is performed by the authentication program 11a. Since the authentication program 11a and the game system program 30f authenticate each other, the processing is called "mutual authentication processing."

The main CPU 21 determines whether the mutual authentication processing f5 is successful or not. If the mutual authentication processing f5 is successful, the main CPU 21 executes processing of Steps S7 to S12 similarly with the first embodiment.

The second embodiment also can cause the RAM 23 on the motherboard 20 to store the gaming information by inserting the memory card 30 into the insertion slot 12 in the gaming board 10. The second embodiment is similar to the first embodiment in that the game program 30e and the game system program 30f are stored in the RAM 23 after successful authentication. However, it is the difference between the first and second embodiments that the second embodiment has the preliminary authentication f4 executed for the authentication program 11a before loaded to the motherboard 20. Since the preliminary authentication f4 in addition to the checksum, which is carried out for the authentication program 11a according to the standard BIOS at loading, is performed to verify the authenticity in the second embodiment, the reliability in the authenticity of the authentication program 11a increases. In addition, the preliminary authentication program 11b for executing the preliminary authentication f4 is stored in ROM such as the boot ROM 11 and cannot be rewritten.

Moreover, in the second embodiment, the mutual authentication f5 is executed for the authentication program 11a using the game system program 30f. Therefore, the verification of authentication is bi-directionally established between the authentication program 11a, and the game program 30e and the game system program 30f. Since the consistency is maintained between the authentication program 11a and a group of the game program 30e and the game system program 30f, which is authenticated by the authentication program 11a, the authenticity of both groups of programs can be more reliable.

It may be possible to hypothesize that the authentication program 11a, the game program 30e, and the game system program 30f, which are stored in the RAM 23 after authentication, may be tampered with after the storage. However, in the second embodiment, the successful authentication is verified after the storage of the programs 11a, 30e and 30f with reference to the authentication log information, and the mutual authentication processing f5 is carried out. It is only if the multi-staged authentication is successful that gaming operations are started to perform. Therefore, even though the gaming information externally supplied is stored in the RAM 23, the stored gaming information cannot be tampered with, which ensures the authenticity of the gaming information and more surely prevents tampering of the gaming information.

In addition, since a predetermined signal needs to be inputted to the GAL 30d to obtain the first area code, the first area code cannot be obtained easily. Moreover, since the CRC method is employed to calculate the second area code by means of comparison between the second area code and the first area code, the reliability of area authentication increases. When the area authentication is successful, a game advances regularly. When the area authentication is not successful, the main CPU 21 determines that the gaming information stored in the RAM 23 does not correspond to the first area code. Therefore, the main CPU recognizes that the game program CF 30a and the game system program CF 30b do not correspond to the first area code. Thus, even though a game program CF and a game system program CF which do not correspond to the first area code are obtained fraudulently, it is possible to prevent starting of a game with the false items.

In addition, sales information such as sales areas and the date of manufacture of the slot machine 41, for example, is stored in the EEPROM 25 so as to restrict operation of the slot machine 41 to a game program CF 30a and a game system program CF 30b, which are manufactured before the date of manufacture. In this way, CFs fraudulently copied after the date of manufacture cannot operate in the slot machine 41.

Although the slot machine 41 for a slot game is described in the abovementioned embodiments, the present invention can apply to a gaming machine capable of playing other games. For example, the present invention can be applied to another game machine such as a card game machine configured to allow a player to play a card game by using card images, a mah-jongg game machine configured to allow a player to play a mah-jongg game, or a pachinko game machine configured to allow a player to play a pachinko game by using a gaming ball. In addition, the present invention is not limited to a video slot machine such as the slot machine 41, but a rotatable slot machine with mechanical reels may be an alternative. Furthermore, although the gaming information is composed of the game program and the game system program in the abovementioned embodiments, it may alternatively be composed of one program or three or more programs.

What is claimed is:

1. A game processing apparatus, comprising:
   a gaming board, wherein the gaming board comprises a boot ROM storing an authentication program;
   a ROM storing a BTOS program;
   a RAM;
   a memory card that stores gaming information including information related to gaming rules corresponding to a predetermined area;

a generic array logic (GAL) that outputs a predetermined first area code representing a specific area, wherein the first area code includes a first portion and a second portion; and a controller configured with logic to:
(a) cause the BIOS program to be activated to verify the authentication program;
(b) cause the authentication program to be written into the RAM if the authentication program is authenticated in (a);
(c) cause the authentication program that is written into the RAM in (b) to be activated to verify the gaming information:
(d) cause the gaming information to be written into the RAM if the gaming information is authenticated in (c);
(e) input a first predetermined input to the GAL to generate the first portion;
(f) input a second predetermined input to the GAL to generate the second portion;
(g) acquire predetermined string data from the gaming information that has been written into the RAM in (d), the predetermined string data including character string data of game data;
(h) calculate a second area code from the predetermined string data;
(i) compare the second area code calculated in (h) with the first area code so as to determine whether the gaming information matches the specific area; and
(j) restrict a start of a game using the gaming information in the specific area when the controller detects that the gaming information does not match the specific area.

2. The game processing apparatus according to claim 1, wherein the memory card is mounted onto a gaming cassette board, and the gaming cassette board is attachable and detachable from the game processing apparatus.

3. The game processing apparatus according to claim 1, wherein the GAL is a nonvolatile memory having read protection.

4. The game processing apparatus according to claim 1, wherein the GAL is configured to output the first area code in response to reception of the predetermined first and second inputs.

5. The game processing apparatus according to claim 1, wherein the controller is further configured with logic to output a cyclic redundancy check (CRC) value for verifying data reliability as the second area code.

* * * * *